(12) United States Patent
Singh

(10) Patent No.: US 8,402,446 B2
(45) Date of Patent: Mar. 19, 2013

(54) ASSOCIATING PROBES WITH TEST CASES

(75) Inventor: Saurabh Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/627,066

(22) Filed: Nov. 30, 2009

(65) Prior Publication Data

US 2011/0131553 A1    Jun. 2, 2011

(51) Int. Cl.
*G06F 9/44* (2006.01)
*G06F 3/048* (2006.01)
*G06F 11/00* (2006.01)

(52) U.S. Cl. ........ 717/129; 717/128; 717/130; 717/131; 715/764; 714/23; 714/25; 714/30; 714/43

(58) Field of Classification Search ........................ None
See application file for complete search history.

(56) References Cited

U.S. PATENT DOCUMENTS

| | | | |
|---|---|---|---|
| 5,854,889 A * | 12/1998 | Liese et al. | 714/43 |
| 5,937,154 A * | 8/1999 | Tegethoff | 714/30 |
| 7,409,677 B1 * | 8/2008 | Leventhal et al. | 717/128 |
| 2002/0095660 A1 * | 7/2002 | O'Brien et al. | 717/128 |
| 2003/0046029 A1 * | 3/2003 | Wiener et al. | 702/186 |
| 2005/0154939 A1 * | 7/2005 | De Pauw et al. | 714/25 |
| 2007/0168736 A1 | 7/2007 | Ottavi et al. | |
| 2008/0109681 A1 * | 5/2008 | De Pauw et al. | 714/38 |
| 2009/0007077 A1 * | 1/2009 | Musuvathi et al. | 717/130 |
| 2009/0125826 A1 * | 5/2009 | Haggerty et al. | 715/764 |
| 2009/0254821 A1 * | 10/2009 | Cates | 717/128 |
| 2009/0265693 A1 * | 10/2009 | Bakowski | 717/131 |
| 2009/0265694 A1 * | 10/2009 | Bakowski | 717/131 |
| 2009/0276663 A1 * | 11/2009 | Kaksonen | 714/25 |
| 2010/0100766 A1 * | 4/2010 | Bengtsson et al. | 714/23 |

OTHER PUBLICATIONS

Adele E. Hove et al., Test Case Generation as an AI Planning Problem, 1997, Automated Software Engineering, 4, 77-106 [Retrieved on Nov. 1, 2012]. Retrieved from the internet: <URL: http://springerlink.com/content/g8n2n215185n7076/fulltext.pdf>30 Pages (77-106).*

Hiralal Agrawal et al., Debugging with Dynamic Slicing and Backtracking, Jun. 1993, Software-Practice and Experience, vol. 23(6), [Retrieved on Nov. 1, 2012]. Retrieved from the internet: <URL: http://onlinelibrary.wiley.com/doi/10.1002/spe.4380230603/pdf>28 Pages (589-616).*

"Platform Debug Release 3.2 Plan," [online] The Eclipse Foundation, [retrieved Nov. 30, 2009] retrieved from the Internet: <http://www.eclipse.org/eclipse/debug/platform/dev_plans/r3_2-plan.php>.

Amini, P., "OLLYDBG Breakpoint Manager," [online] Verisign, Inc., Run-time Analysis Software Tools, [retrieved Nov. 30, 2009] retrieved from the Internet: <http://labs.idefense.com/software/runtime.php#more_ollydbg+breakpoint+manager>.

* cited by examiner

*Primary Examiner* — Don Wong
*Assistant Examiner* — Anibal Rivera
(74) *Attorney, Agent, or Firm* — Patents On Demand P.A.; Brian K. Buchheit; Scott M. Garrett (57) ABSTRACT

A probe (hereinafter also referred to as a breakpoint) can be added into source code of an application program. The probe can be exported to a file or any other form of storage. The probe is then associated with a unique test case for the application program thereby creating a direct mapping between the application program and the test case for the application program. In one embodiment, the probe can be added to at least one of a function or module of the application program.

17 Claims, 7 Drawing Sheets

```
Migrator.java  ⊠ public class Migrator extends AbstractMigration implements ISiteCoreConstants { public IMigrationStatus migrate (IProject project, IProgressMonitor monitor)
    {
        try
        {
            //check if project has website nature
            boolean bWebsiteNatureFound = project.hasNature (NATURE_ID) ;

//if the project has "website" nature , but its ".website-config" do not not have "structure",
            //then remove its "website" nature
            IVirtualComponent component = WebComponentUtil.getFirstComponent (project) ;

if (bWebsiteNatureFound == true) {
                Node topNode = null;
                boolean bsiteStructureEmpy = true;
                IFile file = WebComponentUtil.getWebSiteConfigFile (component) ;
                SiteXmlDocumentUtil docUtil = new Site XmlDocumentUtil () ;
                //docUtil.setRootElementName (SiteXmlStrings.WEBSITE_TAG);
                String filePath = file.getLocation () . toString () ;
                docUtil.load (filePath) ;
                if (docUtil != null)
                    topNode = docUtil.getRootElement () ;
                if (topNode != null)
```

FIG. 1

MIGRATION CODE

FIG. 2
INSERTING PROBES

FIG. 3
EXPORTING PROBES
CREATING FILE

FIG. 4
IMPORTING PROBES

FIG. 5
RECREATING SCENARIO

FIG. 6

ASSOCIATING PROBE WITH TEST CASE

FIG. 7

SOLVING DEFECTS

FIG. 8

DATA PROCESSING SYSTEM

ASSOCIATING PROBES WITH TEST CASES

BACKGROUND

The present disclosure relates to the field of software testing and, more particularly, to associating probes (e.g., breakpoint) with test cases.

Inventors have realized that in the current scenario analyses of code is time consuming. This is especially true if no or inadequate documentation is available. Further, the users analyzing a given functionality in, for example, an application program may not be the owner of the code, which is a condition that when coupled with inadequate document results in a time consuming and error prone testing situation.

SUMMARY

Embodiments of the invention are directed to a method, system and computer program product for testing application, for example application programs, by adding a probe (hereinafter also referred to as a breakpoint) in the application program. The probe is exported to a file or any other form of storage. The probe is then associated with the test case for the application program thereby creating a direct mapping between the application program and the test case for the application program. In a further embodiment, the probe is added to at least one of a function or module of the application program.

In a further embodiment, the breakpoint is imported to check the relevant functions or modules of the application program. In yet a further embodiment, the breakpoint is exported to a filed using a tool, (e.g., software tool such as ECLIPSE, for example). In one embodiment, the probe is added by the developer or engineer developing or testing the application program.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure. For a better understanding of the aspects of the invention presented herein, together with other and further features and advantages thereof, reference is made to the following description, taken in conjunction with the accompanying drawings, and the scope of the invention will be pointed out in the appended claims.

BRIEF DESCRIPTION OF THE DRAWINGS

The subject matter that is regarded as embodiments of the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Reference will now be made in detail to the subject matter disclosed, which is illustrated in the accompanying drawings. It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the disclosure, as claimed, but is merely representative of selected exemplary embodiments of the invention.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention. The illustrated embodiments of the invention will be best understood by reference to the drawings. The following description is intended only by way of example and simply illustrates certain selected exemplary embodiments of the invention as claimed herein.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
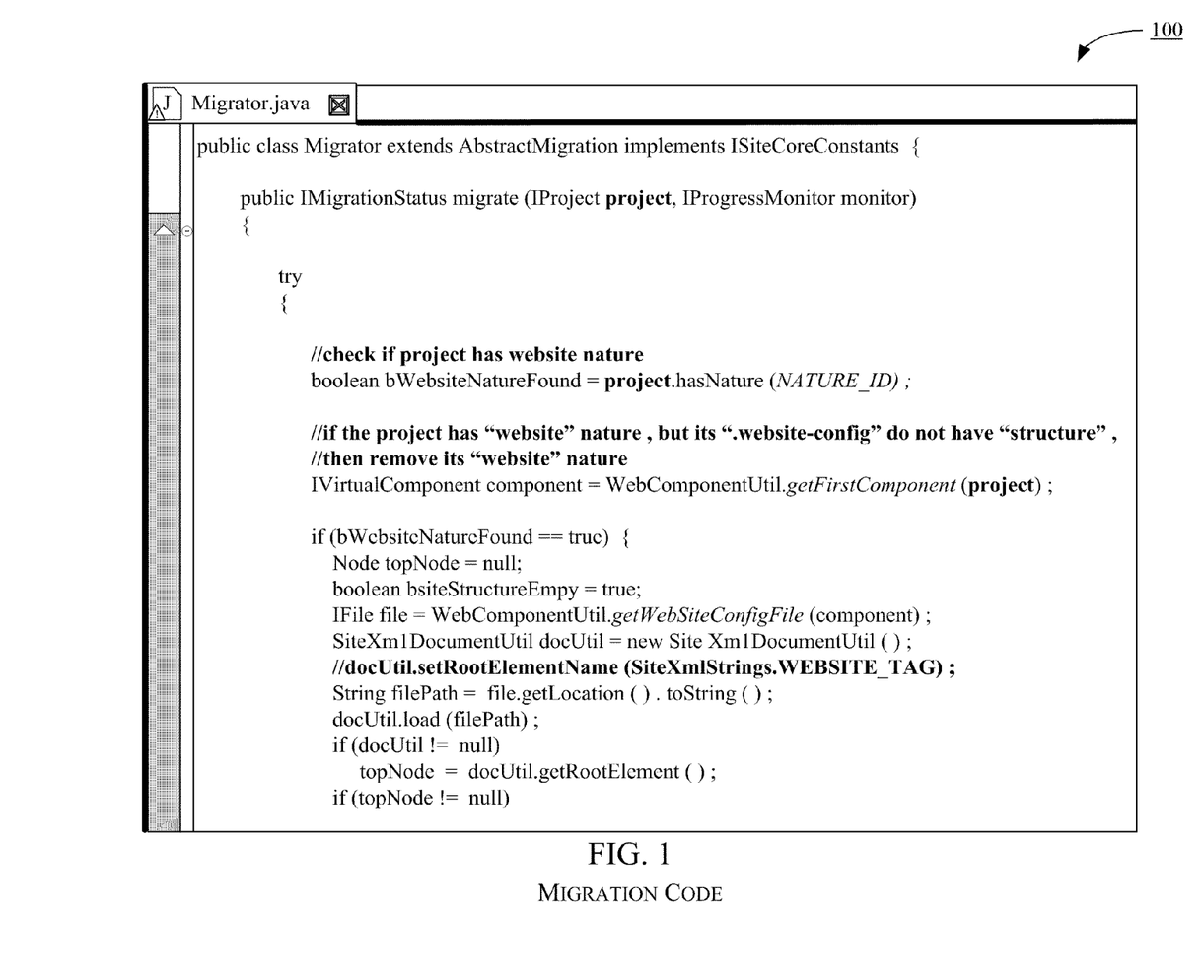
FIG. 1 illustrates an exemplary embodiment of a flow diagram of a method for solving defects.

Assume that a first user was asked to write an application program (hereinafter referred to as code or software core) as illustrated in the exemplary embodiment 100 of FIG. 1, which has the capability of migrating any old projects to a new version. The user went through the migration framework and understood the mechanism. It takes the first user roughly about a week (one week) to understand the framework and implement it, and the first user wrote a code in December 2005. The first user comes up with a migratory as illustrated in FIG. 1, which is illustrated as an application program. It should however be obvious to one skilled in the art that such a migratory code may be written in various other forms, and all such form fall under the scope of the invention.

After completion of writing the migratory code, the first user wrote a test case which looked as follows:
 i. Start RAD 6.0 with a workspace.
 ii. Create a Web Project for example RAD6 Project.
 iii. Open website diagram.
 iv. Add three pages to it.
 v. Save the diagram.
 vi. Export the project as an interchange file, for example Migration.zip.
 vii. Start RAD 7.0 with a fresh workspace.
 viii. Import Migration.zip interchange file created in step (vi).

After this the first user opens the code. The first user has created a single Class file with seven (7) functions. This is a small addition to the already present for example 600 files in the component. The first user now inserts a probe (hereinafter also referred to as breakpoints) as illustrated in an exemplary embodiment 200 of FIG. 2 at the relevant portions in the code, which will be encountered when the migration of the code takes place.

Figure 2:
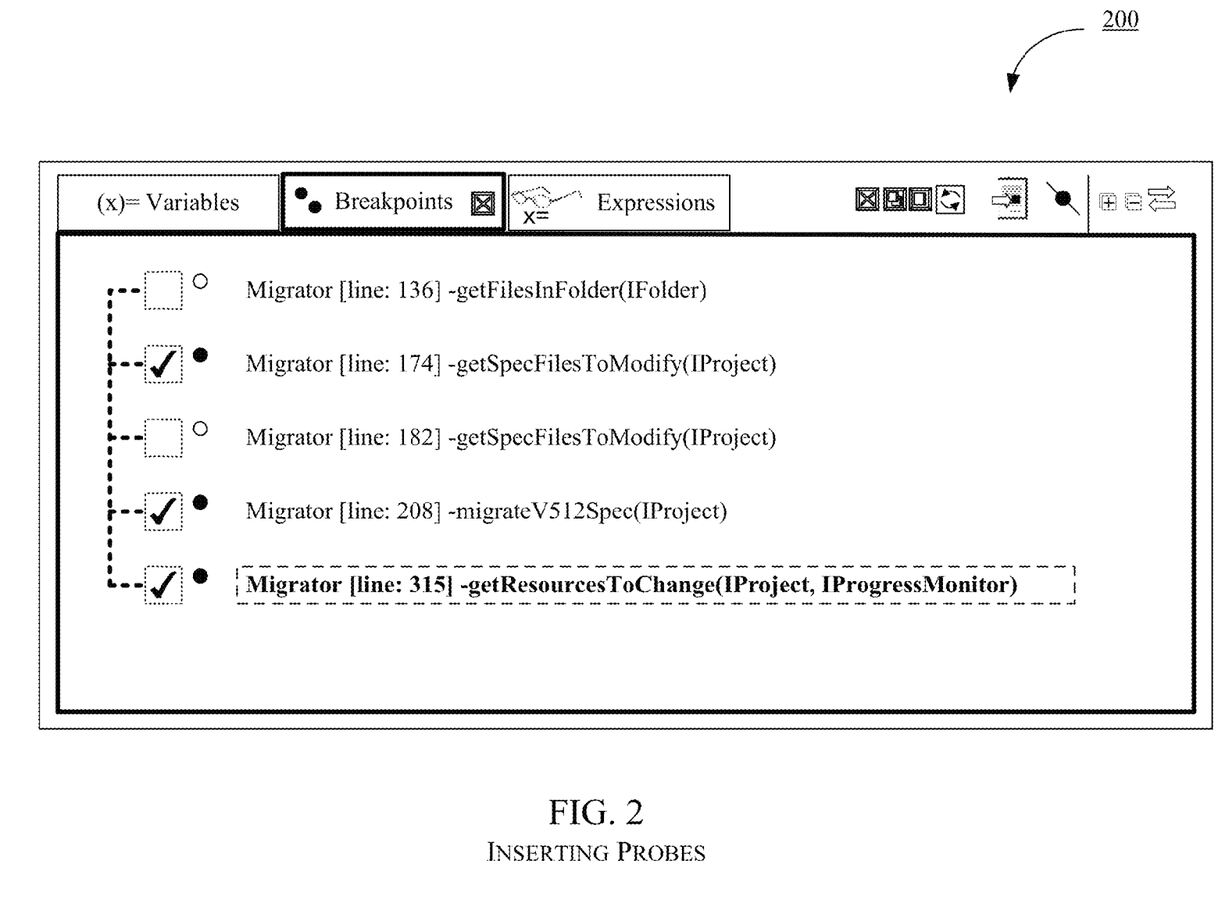
FIG. 2 illustrates an exemplary embodiment of a flow diagram of a method in accordance with the disclosure.
Figure 3:
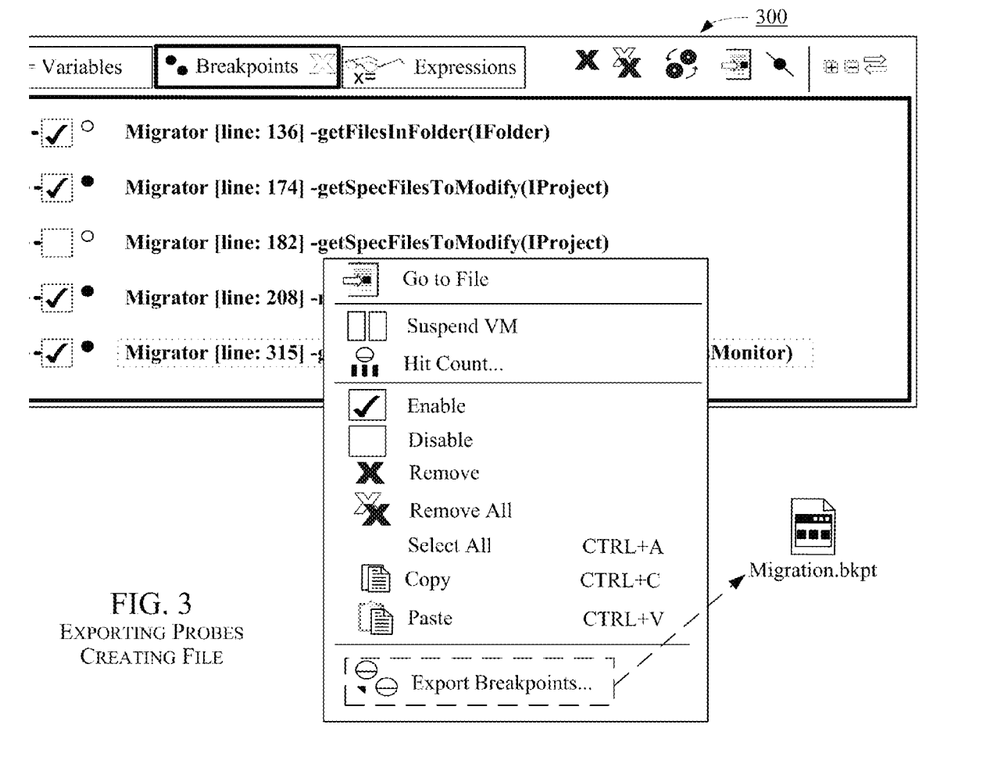
FIG. 3 illustrates an exemplary embodiment of a data processing system on which the methods illustrated in FIG. 1 and FIG. 2 may be implemented.

After insertion of the probes as illustrated in the exemplary embodiment in FIG. 2, the first user then exports the breakpoints using an already existing export option in the debugger tool as illustrated in an exemplary embodiment 300 in FIG. 3, thereby creating an external breakpoint file (migration.bkpt as illustrated in FIG. 3). The breakpoint file is attached to the test case that is written by the first user.

The component that is written by the first user is transitioned over a period of time to another team located in another geographical location, for example another country. The first user who worked on this case decides to move and has now left a vacuum to a second user who might come to take over this work on the same application program.

Figure 4:
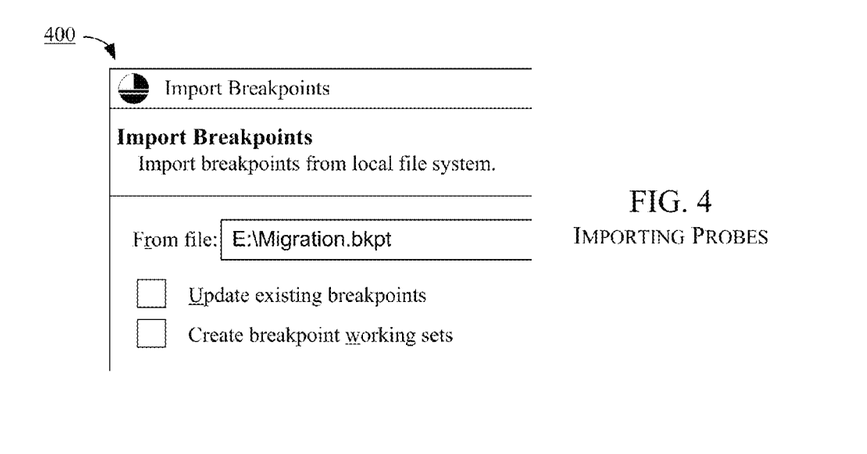
FIG. 4 illustrates a tool for importing probes in accordance with an embodiment of the disclosure.

The second user from a new team executes the test case and realizes that the files are not being migrated correctly to the new version. Therefore there is a problem as hand that needs to be solved and since the first user was involved in the work on the application program. The second user opens the defects in a tool such as Rational® Clear Quest® and the developer manager for the application program assigns the defects noticed to a third user. The third user has joined the team a week ago, for example in July 2008, and is knowledgeable only on what a basic ECLIPSE plug-in looks like and how to use the debugger. The third user has opened the test case, and imported the break points into his code workspace as illustrated by the functionality of the tool as illustrated in an exemplary embodiment 400 of FIG. 4.

Figure 5:
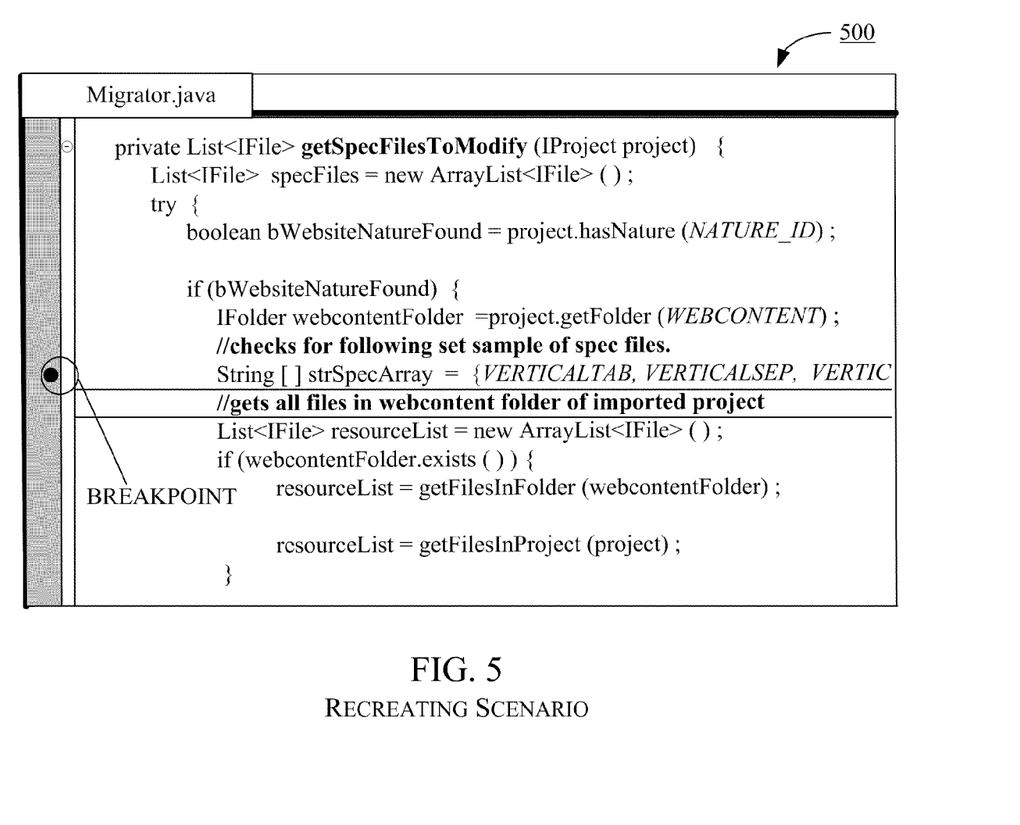
FIG. 5 illustrates a scenario for finding a problematic method in accordance with an embodiment of the disclosure.

In this way, the third user is able to recreates the scenarios as illustrated in an exemplary embodiment 500 in FIG. 5, and he finds that one particular method that was supposed to find the files required for migration was not working correctly He quickly analyses the reasons why the files were not being populated and corrects the issue. He updates the breakpoints and saves them back to the test case. Therefore, the third user who hadn't seen the component code ever before, solved a migration problem written more than two and a half years ago. An advantage was that the third user didn't have to work to find the probable code areas where the problem could be existing. Yet a further advantage was that he didn't have to spend any time into understanding the migration framework. Yet a further advantage was that he didn't have to refer to any documentation, and finally he ended up fixing a problem without any component code coverage.

Figure 6:
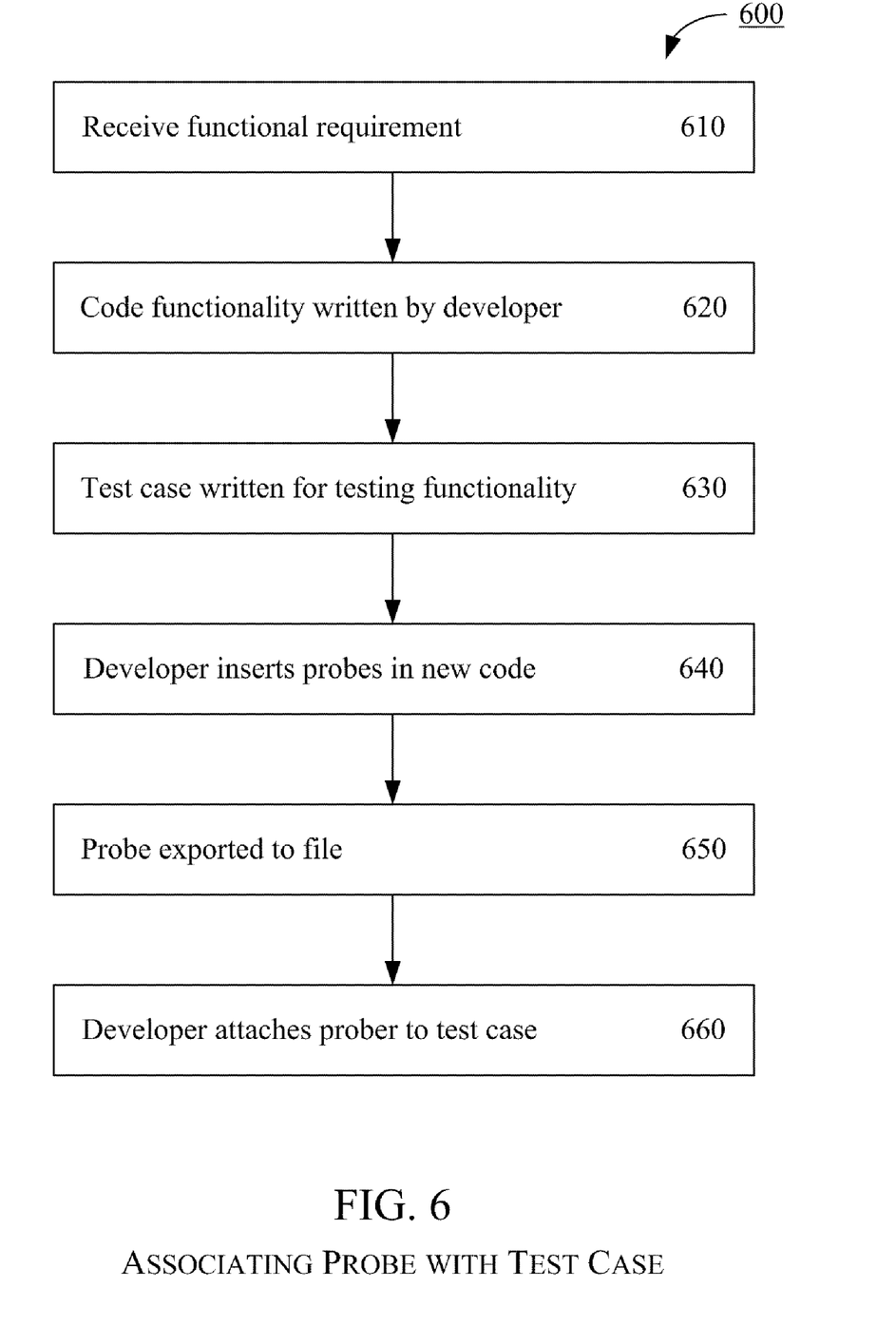
FIG. 6 illustrates a method for associating probes with a test case in accordance with an embodiment of the disclosure.

Reference is now made to FIG. 6 which illustrates an exemplary embodiment of a method 600 for associating probes with a test case. The scenario would be to consider that a functionality needs to be added to a software product. The aim here would be to create the functionality in the code and test the functionality. The functionality will be tested frequently and if any defects or bugs are found, then the code can be fixed by the developers. In step 610 the functional requirements are received. In step 620 as illustrated, the code for the functionality that is received is written by the developer or user. In step 630, the test case for testing the functionality is written, where the test case is actually a function test case which tests the functionality of the code. In step 640, the developer inserts a probe into the new parts of the code that the developer has written. The developer inserts the probes in the new functions that have been added to the already existing code. In step 650 the probes are exported by the developer to a file, for example using a development environments such as ECLIPSE. In step 6660, the developer attaches the breakpoints to the test case, where the test case is generally a document, and it should be obvious to one skilled in the art that such a document may contain artifacts. The essential feature is the method 600 is associating the breakpoints/probes with the test case which creates a direct mapping of the functionality with the code powering it.

Figure 7:
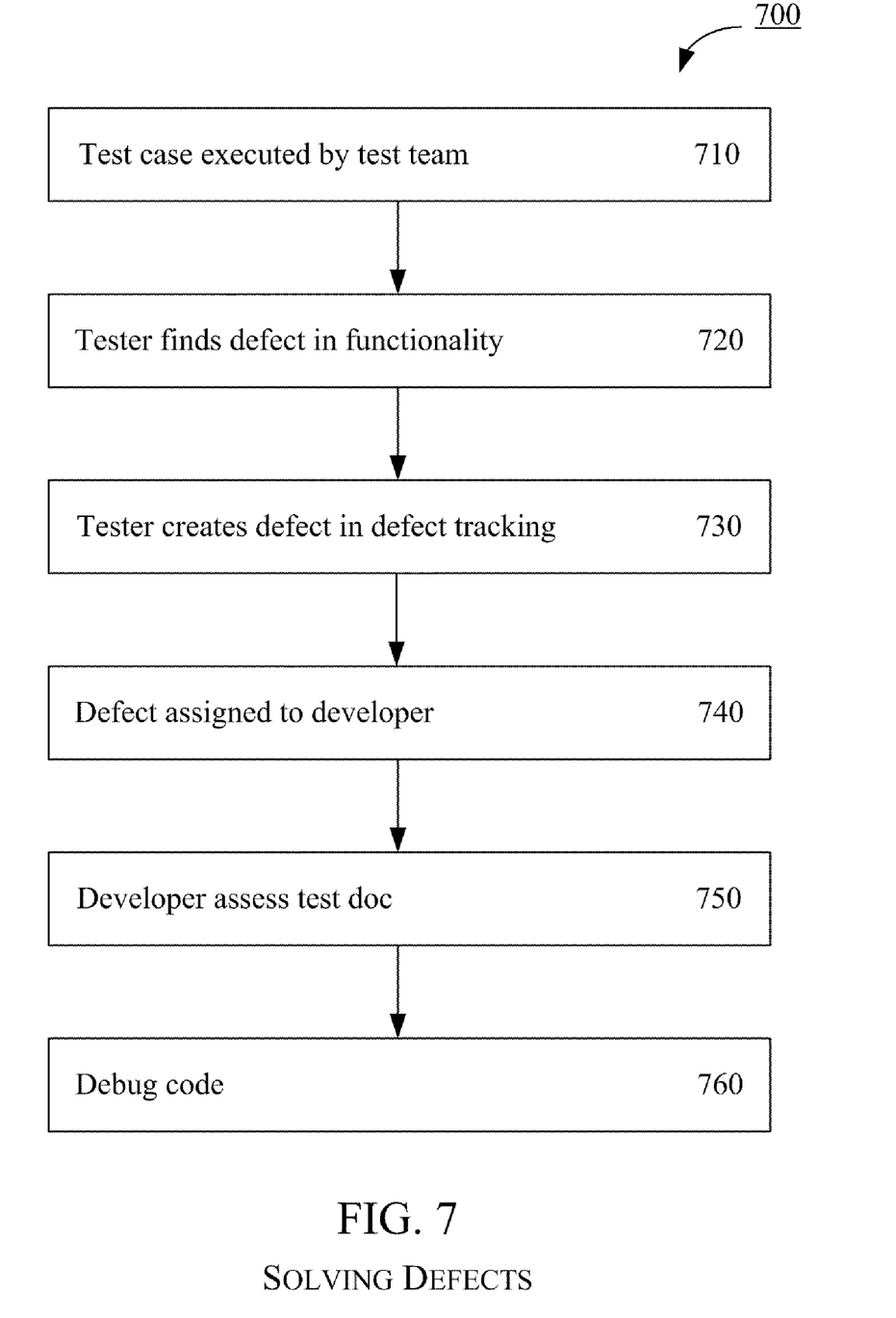
FIG. 7 illustrates a method for solving problems encountered with defects in accordance with an embodiment of the disclosure.

Reference is now made to FIG. 7, which illustrates an exemplary embodiment 700 of how the problems encountered with the defects may be solved by an unknown user. In step 710 the test cases are executed for example by the testing team. In step 720, the tester who is not the developer of the code realizes that there is a defect in the functionality of the code. In step 730, the tester creates a defect in the defect tracking, which may be an external tool associated with the testing environment, and also specifies the test cases that illustrates the defect. In step 740, he defect is now assigned to a developer, who in this instance may not be the same developer who has written the code, to fix the defect that has been found while executing the test case. In step 750, the developer who is assigned the test case opens he test case document. The developer is able to recover the breakpoint file from the test case, and the breakpoints are inserted into the development environment. In step 750, when the developer debugs the code, the parts of the code that are responsible for the functionality will be targeted. The developer can easily analyze the targeted sections of the code and analyze the problems with the code easily. An advantage is that the developer does not have to spend time investigating the code to determine the relevant portions of the code/functionality in the code giving rise to the defect. Even if the developers in the project change, a new developer need not sped time investigating where the defect occurs, thereby saving cost and time.

Figure 8:
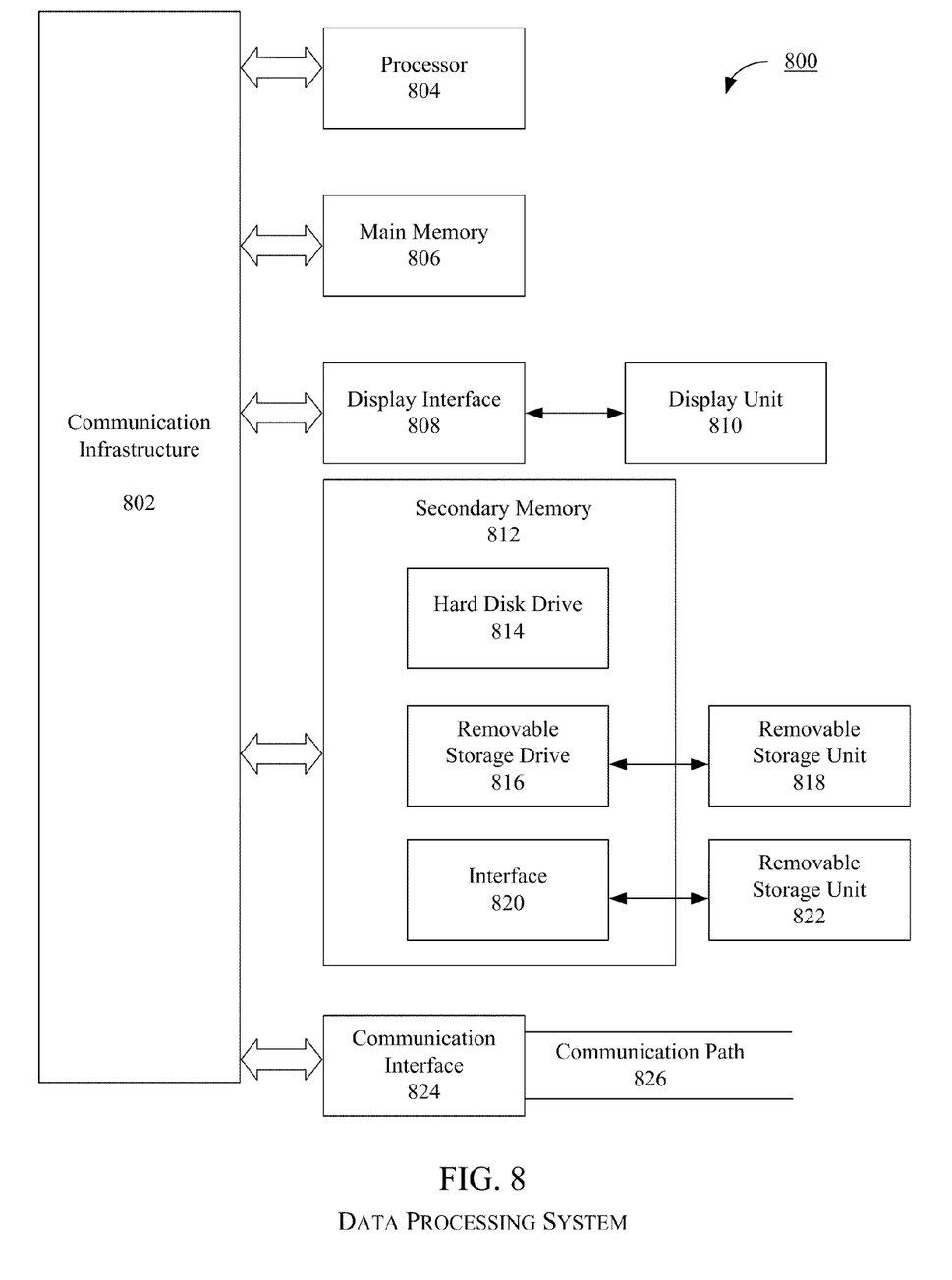
FIG. 8 illustrates a block diagram of a data processing system in accordance with an embodiment of the disclosure.

Reference is not made to FIG. 8 illustrating a block diagram of an exemplary data processing system 800, in which the method as disclosed in FIG. 6 and FIG. 7 may be implemented. The data processing system 800 includes for example a computing system such as a desktop computer, laptop computer, PDA, mobile phone and the like, that can be used for implementing exemplary embodiments of the present invention. Data processing system 800 includes one or more processors, for example processor 804 as illustrated in FIG. 8. Processor 804 is coupled to a communication infrastructure 802 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 800 can include display interface 808 that forwards graphics, text, and other data from the communication infrastructure 802 (or from a frame buffer not shown) for display on display unit 810. Data processing system 800 also includes main memory 806, which can be random access memory (RAM), and may also include secondary memory 812. Secondary memory 812 may include, for example, hard disk drive 814 and/or removable storage drive 816, representing a floppy disk drive, a magnetic tape drive, an optical disk drive, etc. Removable storage drive 816 reads from and/or writes to removable storage unit 818 in a manner well known to those having ordinary skill in the art. Removable storage unit 818, represents, for example, a floppy disk, magnetic tape, optical disk, etc. which is read by and written to by removable storage drive 816. As will be appreciated, removable storage unit 818 includes a computer usable storage medium having stored therein computer software and/or data.

In exemplary embodiments, secondary memory 812 may include other similar means for allowing computer programs or other instructions to be loaded into the computer system. Such means may include, for example, removable storage unit 822 and interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from removable storage unit 822 to data processing system 800.

Data processing system 800 may also include a communications interface 824. Communications interface 824 allows software and data to be transferred between the data processing system and any other external devices. Examples of communications interface 824 may include a modem, a network interface (such as an Ethernet card), a communications port, a PCMCIA slot and card, etc. Software and data transferred via communications interface 824 are typically in the form of signals which may be, for example, electronic, electromagnetic, optical, or other signals capable of being received by communications interface 824. These signals are provided to communications interface 824 via communications path (that is, channel) 826. Channel 826 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 806 and secondary memory 812, removable storage drive 816, a hard disk installed in hard disk drive 814, and signals thereof. Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs (also called computer control logic) are typically stored in main memory 806 and/or secondary memory 812. Computer programs may also be received via communications interface 824. Such computer programs, when executed, can enable the computer system to perform the features of exemplary embodiments of the invention as discussed herein. In particular, computer programs, when executed, enable processor 804 to perform the features of data processing system 800. Accordingly, such computer programs represent controllers of the data processing system.

In accordance with the exemplary embodiments disclosed, the system and methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The flowchart and/or block diagram(s) in the Figure(s) described herein illustrate the architecture, functionality, and/or operation of possible implementations of systems, methods, and/or computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in a flowchart or block diagram may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in a flowchart or block diagram can be implemented by special purpose hardware-based systems that perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiment(s) were chosen and described in order to explain the principles of the present invention and the practical application, and to enable others of ordinary skill in the art to understand the present invention for various embodiments with various modifications as are suited to the particular use contemplated.

As will be appreciated by one skilled in the art, the present invention may be embodied as a system, method, and/or computer program product. Accordingly, the present invention may take the form of an entirely hardware embodiment, an entirely software embodiment (including firmware, resident software, micro-code, etc.), and/or or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider)

The disclosure is described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s)

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram blocks.

The terminology used herein is for the purpose of describing exemplary embodiments and is not intended to be limiting of the present invention. As used herein, the singular forms "a", "an", and "the" are intended to include the plural forms as well, unless the context clearly indicates otherwise. It will be further understood that the terms "comprises", "comprising", "includes", or "including" when used in this specification, specify the presence of stated features, integers, steps, operations, elements, and/or components, but do not preclude the presence or addition of one or more other features, integers, steps, operations, elements, components, and/or groups thereof.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for testing application programs, the method comprising:
   adding at least one probe in an application program;
   exporting each of the at least one probe to a file; and
   storing the file, wherein the file comprises a mapping of between breakpoints corresponding to probes, wherein each breakpoint is associated with the application program and a unique test case
   executing a test case on the application program;
   determining that an error is found; and
   responsive to the determining of the error, assigning the error to a user, wherein the method comprises importing the file containing the probes to ascertain the exact location of the error.

2. The method as claimed in claim 1, wherein the probes are stored as at least one of a structured or unstructured data in the file.

3. The method as claimed in claim 1, further comprises index linking each of the probes in the file with at least one corresponding test case.

4. The method as claimed in claim 1, wherein each of the probes in the application program is added by a user.

5. The method as claimed in claim 1, wherein exporting the probes to a file is performed using a software tool.

6. The method as claimed in claim 1, wherein importing the probes from the file is performed using a software tool.

7. A system comprising at least a processor and a memory configured for testing application programs, the system capable of:
  adding at least one probe in an application program;
  exporting each of the at least one probe to a file; and
  storing the file, wherein the file comprises a mapping of between breakpoints corresponding to probes, wherein each breakpoint is associated with the application program and a unique test case
  executing a test case on the application program;
  determining that an error is found; and
  responsive to the determining of the error, assigning the error to a user, wherein the method comprises importing the file containing the probes to ascertain the exact location of the error.

8. The system as claimed in claim 7, wherein the probes are stored as at least one of a structured or unstructured data in the file.

9. The system as claimed in claim 7, the system being further capable of:
  associating each of the probes in the file with the at least one test case.

10. The system as claimed in claim 7, wherein each of the probes in the application program is added by a user.

11. The system as claimed in claim 7, wherein exporting the probes to a file is performed using a software tool.

12. The system as claimed in claim 7, wherein importing the probes from the file is performed using a software tool.

13. A computer program product comprising a computer readable tangible storage medium having computer readable program code embodied therewith, the computer readable program code configured for managing tasks in a computer system having a plurality of CPUs, the computer program product when executed on the computer system performing the steps of:
  adding at least one probe in an application program;
  exporting each of the at least one probe to a file; and
  storing the file, wherein the file comprises a mapping of between breakpoints corresponding to probes, wherein each breakpoint is associated with the application program and a unique test case;
  executing a test case on the application program;
  determining that an error is found; and
  responsive to the determining of the error, assigning the error to a user, wherein the method comprises importing the file containing the probes to ascertain the exact location of the error.

14. The computer program product as claimed in claim 13, wherein the probes are stored as at least one of a structured or unstructured data in the file.

15. The computer program product as claimed in claim 13, wherein when the computer program product is executed on the computer system it further performs the steps of:
  index linking each of the probes in the file with at least one corresponding test case.

16. The computer program product as claimed in claim 13, wherein the probes in the application program is added by a user.

17. The computer program product as claimed in claim 13, wherein exporting and importing the probes is performed using a software development tool.

* * * * *